United States Patent
Sperlich et al.

(10) Patent No.: US 6,749,948 B2
(45) Date of Patent: Jun. 15, 2004

(54) POLYOLEFIN FILM WITH PEELABLE OUTER LAYER

(75) Inventors: Bernd Sperlich, Walsrode (DE); Hans Wunderlich, Bomlitz (DE); Helmut Wagner, Bomlitz (DE); Willi Schwarz, Bomlitz (DE)

(73) Assignee: Wipak Walsrode GmbH Co. & KG, Walsrode (DE)

( * ) Notice: Subject to any disclaimer, the term of this patent is extended or adjusted under 35 U.S.C. 154(b) by 0 days.

(21) Appl. No.: 10/145,296

(22) Filed: May 14, 2002

(65) Prior Publication Data

US 2003/0068514 A1 Apr. 10, 2003

(30) Foreign Application Priority Data

May 18, 2001 (DE) .......................................... 101 24 209

(51) Int. Cl.⁷ ............................................... B32B 27/32
(52) U.S. Cl. ....................... 428/516; 428/515; 428/520; 428/910
(58) Field of Search ................................ 428/515, 516, 428/910, 520

(56) References Cited

U.S. PATENT DOCUMENTS

| | | | |
|---|---|---|---|
| 4,666,778 A | 5/1987 | Hwo | 428/412 |
| 5,437,911 A | 8/1995 | Rohrka et al. | 428/195 |
| 5,500,265 A | 3/1996 | Ambroise et al. | 428/41 |
| 5,716,698 A | 2/1998 | Schreck et al. | 428/323 |
| 5,997,968 A | 12/1999 | Dries et al. | 428/35.7 |

FOREIGN PATENT DOCUMENTS

| | | |
|---|---|---|
| EP | 0 753 403 | 1/1997 |
| WO | 96/04178 | 2/1996 |
| WO | 01/15897 | 3/2001 |

OTHER PUBLICATIONS

Patents Abstracts of Japan vol. 1998, No. 02, Jan. 30, 1998 & JP 09 262948 A (Mitsui Petrochem Ind Ltd), Oct. 7, 1997 Zusammenfassung.

*Primary Examiner*—D. S. Nakarani
(74) *Attorney, Agent, or Firm*—Foley & Larbner LLP

(57) ABSTRACT

A peelable, biaxially oriented, transparent multilayer polyolefin film having at least three layers is described. The peelable, biaxially oriented, transparent multilayer polyolefin film, comprises: (a) a transparent polyolefin base layer; (b) at least one peelable outer layer comprising one of, (i) a polymer selected from at least one of LLDPE, LDPE, MDPE, ethylene-vinyl acetate copolymer, ethylene-methyl acrylate copolymer and HDPE, and (ii) a combination of at least one propylene co- or terpolymer and at least one ethylenic polymer; and (c) at least one intermediate layer comprising a propylene co- or terpolymer. The intermediate layer (c) of the multilayer film is interposed between the base layer (a) and the peelable layer (b). Also described is a method of preparing the multilayer film, which results in the base layer and intermediate layer(s) being biaxially stretched, and the peelable layer(s) being monoaxially stretched. The multilayer films of the present invention have utility as packaging films.

7 Claims, No Drawings

POLYOLEFIN FILM WITH PEELABLE OUTER LAYER

CROSS REFERENCE TO RELATED PATENT APPLICATION

The present patent application claims the right of priority under 35 U.S.C. §119 (a)–(d) of German Patent Application No. 10124209.3, filed May 18, 2001.

FIELD OF THE INVENTION

The present invention relates to biaxially stretched multilayer polyolefin films having a base layer, at least one intermediate layer, and at least one peelable outer layer, in which the intermediate layer is interposed between the base layer and the peelable outer layer. The present invention also relates to a method of preparing such multilayer films, in which the base and intermediate layer(s) are biaxially stretched, and the peelable outer layer(s) is monoaxially stretched.

BACKGROUND OF THE INVENTION

In stretched polyolefin films, in particular biaxially oriented polypropylene films, the mechanical strength of seal seams is often higher than that of the film itself, and therefore when a sealed pack is opened it is not only the seal seam which is broken apart. Typically, a tear propagates in an uncontrolled manner through the entire film upon opening. Peelable films are films which once sealed can be separated again mechanically without damaging or destroying the film itself. Peelable seal layers are typically required to have good sealing properties and also permit controlled opening of the pack. An important feature of this type of peelable seal layer is that this behaviour arises over a very large range of temperature of the sealing tools, and that the seal seam strength is very constant over this temperature range. The seal seam strength for stretched polyolefin films here must not be excessively high, since these films have very low tear propagation resistance and tear apart in an uncontrolled manner when subjected even to the most minor damage. Another important feature is the requirement of good film transparency, this being desirable for many applications in order to give the product complete or partial visibility and in some instances to provide good legibility of markings. An example of where transparency is desirable is with the packaging of compact discs.

Another important feature is good hot seal seam strength. This is necessary since, especially when producing bags on vertical tubular bag machines, directly after sealing of the basal seam the product to be packaged drops onto the basal seam while it is still hot. The resultant mechanical load placed upon the bag's basal seam, which is still hot, must not lead to any damage to the seam, nor indeed cause the bag to break open.

U.S. Pat. No. 4,666,778 discloses transparent, peelable films with high seal seam strength. The peelable layers have a thickness of 40 μm or above. Seal layers of this thickness are disadvantageous for oriented polyolefin films, since they make them unsuitable for many applications where thin films are required.

EP-A-0 692 373 and EP-A-0 781 652 describe opaque films with at least one peelable outer layer. However, a transparent film is desirable for many applications.

U.S. Pat. No. 5,500,265 discloses a peelable film. The coating is composed of an acrylic polymer or of a polyvinylidene chloride polymer. A disadvantage of this film is that the cut material cannot be recycled. The film is expensive to produce, since coating has to take place in a separate operation after film production, and often requires an additional adhesion promoter.

SUMMARY OF THE INVENTION

The object was therefore to provide a stretched multilayer polyolefin film with high transparency, which is peelable after sealing at various temperatures and thus has a wide peel range. The film also has a high hot seal seam strength and very constant seal seam strengths over this peel range.

In accordance with the present invention, there is provided a peelable, biaxially oriented, transparent multilayer polyolefin film, having at least three layers, comprising:
   a) a transparent polyolefin base layer;
   b) at least one peelable outer layer comprising one of,
      (i) a polymer selected from at least one of LLDP, LDPE, MDPE, ethylene-vinyl acetate copolymer, ethylene-methyl acrylate copolymer and HDPE, and
      (ii) a combination of at least one propylene co- or terpolymer and at least one ethylenic polymer; and
   c) at least one intermediate layer comprising a propylene co- or terpolymer, wherein said intermediate layer c) is interposed between said base layer a) and said peelable layer b).

Unless otherwise indicated, all numbers expressing quantities of ingredients, reaction conditions, etc. used in the specification and claims are to be under stood as modified in all instance by the term "about."

DETAILED DESCRIPTION OF THE INVENTION

The film of the invention has at least three layers and encompasses, as substantive layers, always: the transparent base layer, which is preferably composed of polypropylene; at least one intermediate layer made from propylene co- or terpolymer; and at least one peelable outer layer, preferably outer layers on both sides, which may be identical or different. In the case of a single-side peelable outer layer the opposite outer layer is preferably a sealable outer layer. Among the numerous materials used for sealable layers, preference is given to the use of the polymers selected from at least one of: random propylene-ethylene copolymers; random propylene-1-olefin copolymers; and random propylene-ethylene-olefin terpolymers.

A particularly preferred propylene-ethylene copolymer for use in the optional sealable layer is characterized in that it contains from 1.0 to 10% by weight of ethylene. The density of the seal layer polymer is preferably in the range of 0.895 to 0.960 g/cm$^3$, and, depending on the type, the crystalline melting point is preferably from 120 to 150° C.

In an embodiment of the present invention, the multilayer film has four layers, one of which is a sealable outer layer d). More particularly, in the four-layered film: the transparent polyolefin base layer a) is interposed between the sealable outer layer d) and the intermediate layer c); and the intermediate layer c) is interposed between the transparent polyolefin base layer a) and the peelable outer layer b). The structure of this four layer film is represented by the following:

|sealable layer (d)|base layer (a)|intermediate layer (c)|peelable layer (b)|

If the film of the invention has two peelable outer layers, the film also preferably has two intermediate layers, location of each of these being between the outer layers and the interior base layer. If the film of the invention has only one peelable outer layer, the film also typically has only one intermediate layer between the peelable outer layer and the base layer.

In an embodiment of the present invention, the multilayer film comprises five layers, in which two outer peelable layers (b), two intermediate layers (c) and one transparent base layer (a) are present. More particularly, in the five layered film: the transparent polyolefin base layer a) is interposed between two intermediate layers c); and each of the intermediate layers c) is interposed between a peelable outer layer b) and the transparent polyolefin base layer a). Each of the two separate intermediate layers c) may have the same or different compositions, and each of the two separate peelable outer layers b) may have the same or different compositions. The structure of this five layer is represented by the following, in which "int." means intermediate, and "peel" means peelable:

|peel layer (b)|int. layer (c)|base layer (a)|int. layer (c)|peel layer (b)|

The overall thickness of the multilayer film of the present invention may vary within wide limits. In a preferred embodiment, the multilayer film has an overall thickness of from 10 to 100 μm, and more preferably from 15 to 40 μm. The thickness of the peelable outer layer(s) is preferably in the range from 0.5 to 8 μm. The thickness of the intermediate layer(s) made from propylene co- or terpolymer is preferably in the range from 0.5 to 5 μm.

The base layer is preferably substantively or completely composed of a polypropylene. It is preferable to use an isotactic polypropylene with density of from 0.90 to 0.91 g/cm$^3$ and with a melt flow index of from 1 to 4 g/10 min at 230° C. and 21.6 N (to DIN 53 735). The film may also comprise lubricants and antistats.

Lubricants that may be used in the multilayered film of the present invention include, for example, higher aliphatic amides, higher aliphatic esters, waxes and metal soaps, and also polydimethylsiloxanes. The effective amount of lubricant is in the range from 0.01 to 3% by weight, preferably from 0.02 to 1% by weight. Addition of amounts of higher aliphatic amides in the range from 0.01 to 0.25% is particularly suitable. Erucamide is a particularly suitable aliphatic amide.

Preferred antistats that may be used in the multilayered film of the present invention include, for example, alkali metal alkanesulphonates, polyether-modified, i.e. ethoxylated and/or propoxylated polydiorganosiloxanes (polydialkylsiloxanes, polyalkylphenylsiloxanes and the like) and/or the substantively straight-chain and saturated aliphatic, tertiary amines having an aliphatic radical having from 10 to 20 carbon atoms, where these have substitution by o)-hydroxy-($C_1$–$C_4$)-alkyl groups, particularly suitable compounds being N,N-bis-(2-hydroxyethyl)-alkylamines having from 10 to 20 carbon atoms, preferably from 12 to 18 carbon atoms, in the alkyl radical. The effective amount of antistat is typically in the range from 0.05 to 0.5% by weight. Glycerol monostearate is also a suitable antistat, the amount used being from 0.03 to 0.5% by weight.

In a preferred embodiment, the peelable layer is substantively composed of LLDPE, LDPE, MDPE, ethylene-vinyl acetate copolymer, ethylene-methyl acrylate copolymer, HDPE or a mixture of these. The ethylenic polymers mentioned preferably have an ethylene content of from 80 to 100% by weight, with preference from 95 to 100% by weight. LDPE and LLDPE are particularly suitable.

In another preferred embodiment, the peelable layer is substantively composed of a mixture made from at least one propylene co- or terpolymer and from at least one ethylenic polymer, e.g. LLDPE, LDPE, MDPE, ethylene-vinyl acetate copolymer, ethylene-methyl acrylate copolymer or HDPE. The ethylenic polymers mentioned preferably have an ethylene content of from 80 to 100% by weight, with preference from 95 to 100% by weight. LDPE and LLDPE are particularly suitable.

The propylene co- or terpolymers of the peelable layer generally have a melt flow index of from 1.5 to 30 g/l 0 min, preferably from 3 to 15 g/10 min (to DIN 53 735). The melting point is in the range from 120 to 140° C.

In a preferred embodiment of the present invention, the intermediate layer c) comprises, and is preferably composed substantially of, at least one of: (i) a copolymer selected from at least one of a copolymer of propylene and ethylene, a copolymer of propylene and butylene, and a copolymer of propylene and another olefin having from 5 to 10 carbon atoms; and (ii) a terpolymer selected from at least one of a terpolymer of propylene, ethylene and butylene, and a terpolymer of propylene, ethylene and another olefin having from 5 to 10 carbon atoms.

The propylene co- or terpolymers of intermediate layer c) generally have a melt flow index of from 1.5 to 30 g/l 0 min, preferably from 3 to 15 g/10 min (DIN 53 735). The melting point is typically in the range from 120 to 140° C.

The films of the invention may be produced by conventional processes, such as lamination, coating, or melt coextrusion. Once the high-gauge film has been extruded and solidified on the casting roll, the film is stretched in the machine direction (longitudinally) with an orientation factor of from 4/1 to 7/1 at a temperature of from 120 to 150° C. The transverse stretching ratio is preferably from 8/1 to 12/1, and the transverse stretching of the film is carried out at a temperature of from 130 to 170° C. To ensure that the substantially non-polar film surface has affinity for printing inks, it is useful to subject the film to corona (discharge) pretreatment in a manner known per se, thus incorporating atmospheric oxygen in the form of carbonyl, epoxy, ether or alcohol groups on the film surface. Other methods of pretreatment for polypropylene films are pretreatment using flame, plasma or fluorination methods.

In accordance with the present invention, there is further provided a process for producing the multilayer film, which comprises:

(A) coextruding, through a flat-film die, the base layer a) and the intermediate layer c) to form a coextruded first film comprising the base layer a) abutting at least one intermediate layer c);

(B) drawing the first film off of at least one roller and solidifying the first film;

(C) stretching the solidified first film in the direction in which it is drawn off of said roller (or in the direction of running of the machine);

(D) applying the peelable layer b) to the intermediate layer c) of the stretched first film by means of a combination of exposure to heat and pressure, thereby forming a second film; and (E) stretching the second film in a direction perpendicular to the stretching of step (C), thereby forming the biaxially oriented multilayer film of the present invention.

When in an embodiment of the invention the multilayer film includes an exterior sealable layer d) the exterior layer is coextruded with the base layer a) in step (A) of the process.

The result of the above process is that the base layer and the intermediate layer(s) have been stretched biaxially, but the peelable outer layer(s) have been stretched only monoaxially, i.e., perpendicularly to the direction of running of the machine.

The film of the invention has good peel properties, good hot seal seam strength, and high transparency. The seal seam strength remains at a substantially constant level over a wide temperature range, giving the packaging machine wide processing latitude.

Test Methods:

Determination of Seal Seam Strength:

This was determined by placing two strips of width 15 mm one on top of the other, and using a sealing time of 0.5 s and a sealing pressure of 50 N/cm$^2$ for sealing at the respective temperature. The force needed to separate the seal seam was then measured.

Determination of Hot Seal Seam Strength:

Hot seal seam strength was determined on a vertical tubular bag machine from the company Bosch (model SVZ 1650 AM), by packing 500 g of dried peas at 50 cycles/min with a sealing temperature of 140° C. (profile across the seal seam). The drop height for the peas is 1 m. The test is passed if the seal seams are not damaged by the impact of the peas.

After the stretching process, the thickness of the five-layer composite film is 25 μm. Each of the two intermediate layers (outer layers of the base film) has a thickness of 1 μm. Each of the two outer layers of the five-layer composite film has a thickness of 3 μm.

TABLE 1

| Example | Outer layer [1] constituents |
|---|---|
| E1 | 99% ethylene-vinyl acetate copolymer [2] |
| E2 | 99% LDPE [3] |
| E3 | 70% LDPE [3] |
|  | 29% propylene-ethylene copolymer [4] |
| C4 (comparative example) | 99% propylene-ethylene copolymer [4] |
| C5 (comparative example) [5] | 99% LDPE [3] |

[1] Besides the constituents listed in the table, each outer layer comprises 0.3% by weight of N,N-bis-(2-hydroxyethyl)-($C_{12}$–$C_{16}$)-alkylamine, 0.6% by weight of a polydimethylsiloxane of density 0.985 g/cm$^3$ at 20° C. and of viscosity 10$^6$ m Pa s, and 0.1% by weight of silicon dioxide with an average particle size of 4 μm.
[2] 5% vinyl acetate monomer content, MFI = 7.5 g/10 min (ASTM D 1238), density: 0.925 g/cm$^3$
[3] MFI = 7.5 g/10 min (ASTM D1238); density: 0.9155 g/cm$^3$)
[4] 4.5% ethylene monomer content, MFI = 5 g/10 min (230° C. and 2.16 kp/cm$^2$), density: 0.90 g/cm$^3$
[5] In Example 5 (comparative example) the base film is composed only of one layer (layer thickneww after stretching: 19 μm) of polypropylene of density 0.91 g/cm$^3$ with a melt index of 3.0 g/10 min at 230° C. and 21.6 N.

TABLE 2

| | Seal seam strength in N/15 mm at sealing temperature below | | | | | |
|---|---|---|---|---|---|---|
| Example | 90° C. | 100° C. | 110° C. | 120° C. | 130° C. | 140° C. |
| E1 | 0.1 (peelable) | 0.6 (peelable) | 0.6 (peelable) | 0.7 (peelable) | 0.7 (peelable) | 0.7 (peelable) |
| E2 |  | 0.3 (peelable) | 0.5 (peelable) | 0.5 (peelable) | 0.8 (peelable) | 0.7 (peelable) |
| E3 |  | 0.2 (peelable) | 0.4 (peelable) | 1.0 (peelable) | 1.3 (peelable) | 1.4 (peelable) |
| C4 |  |  |  | 1.0 (film tears) | 1.6 (film tears) | 2.1 (film tears) |
| C5 |  | 0.3 (peelable) | 1.0 (film tears) | 1.3 (film tears) | 1.2 (film tears) | 1.5 (film tears) |

EXAMPLES

The two outer layers with the constituents given in Table 1 are applied to a monoaxially stretched, three-layer base film, and then stretched perpendicularly to the machine direction, giving a five-layer composite film with a longitudinal stretching ratio of 5:1 and a transverse stretching ratio of 10:1, the two outer layers having been stretched only perpendicularly to the machine direction. The coextruded three-layer base film is composed of a base layer made from polypropylene of density 0.91 g/cm$^3$ with a melt index of 3.0 g/10 min at 230° C. and 21.6 N, and of two outer layers made from propylene-ethylene copolymers with an ethylene content of 4.5%, an MFI of 5 g/10 min (230° C. and 2.16 kp/cm$^2$), and density of 0.90 g/cm$^3$. The outer layers of the three-layer base film form the intermediate layers in the five-layer composite film.

TABLE 3

| Hot seal seam strength (loading by 500 g of peas) | |
|---|---|
| Example 1 | slight damage to seal seam (bag base) |
| Example 2 | slight damage to seal seam (bag base) |
| Example 3 | No damage to seal seam (bag base) |
| Example 4 (comparative example) | No damage to seal seam (bag base) |
| Example 5 (comparative example) | Severe damage to seal seam (bag base); impact due to contents causes penetration of seal seam |

It can be seen from Table 2 that in Examples 1 to 3 the seal seam strength is approximately constant over a range of 40° C., and in no case is the film damaged when the seal seam is pulled apart. Examples 4 and 5 show these films are destroyed when the seal seam is pulled apart.

Table 3 shows the hot seal seam strengths. In the case of Examples 1 to 3 for the film of the invention the base seam of the bag suffers no, or only slight, damage. In the case of the film in Example 4 (comparative example), although again no damage occurs, this film is not peelable at any sealing temperature (see Table 2). The film in Comparative Example 5 exhibits poor hot seal seam strength.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A peelable, biaxially oriented, transparent multilayer polyolefin film, having at least three layers, comprising:
   a) a transparent polyolefin base layer;
   b) at least one peelable outer layer comprising one of,
      (i) a polymer selected from at least one of LLDPE, LDPE, MDPE, ethylene-vinyl acetate copolymer, ethylene-methyl acrylate copolymer or HDPE, and
      (ii) a combination of at least one propylene co- or terpolymer end at least one ethylenic polymer; and
   c) at least one intermediate layer comprising a propylene co- or terpolymer,
   wherein said intermediate layer c) is interposed between said base layer a) and said peelable layer b).

2. The multilayer film of claim 1 wherein the transparent polyolefin base layer a) consists essentially of polypropylene.

3. The multilayer film of claim 1 wherein the intermediate layer c) comprises at least one of:
   (i) a copolymer selected from at least one of a copolymer of propylene and ethylene, a copolymer of propylene and butylene, and a copolymer of propylene and another olefin having from 5 to 10 carbon atoms; and
   (ii) a terpolymer selected from at least one of a terpolymer of propylene, ethylene or butylene, and a terpolymer of propylene, ethylene and another olefin having from 5 to 10 carbon atoms.

4. The multilayer film of claim 1 further comprising a sealable outer layer d), wherein said multilayer film comprises four layers in which said transparent polyolefin base layer a) is interposed between said sealable outer layer d) and said intermediate layer c), and sold intermediate layer c) is interposed between said transparent polyolefin base layer a) and said peelable outer layer b).

5. The multilayer film of claim 4 wherein said sealable outer layer d) comprises a polymer selected from at least one of random propylene-ethylene copolymers, random propylene-1-olefin copolymers or random propylene-ethylene-olefin terpolymers.

6. The multilayer film of claim 1 comprising five layers wherein said transparent polyolefin base layer a) is interposed between two intermediate layers c), and each of said intermediate layers c) Is interposed between a peelable outer layers b) and said transparent polyolefin base layer a), each of said intermediate layers c) being the same or different, and each of said peelable outer layers b) being the same or different.

7. The peelable multilayer film of claim 1 wherein said film is a multilayer packaging film.

* * * * *